United States Patent
Pearson et al.

(10) Patent No.: US 7,178,203 B2
(45) Date of Patent: Feb. 20, 2007

(54) ANTI-REMOVAL RATCHET CLIP

(75) Inventors: Timothy D. Pearson, Orland Park, IL (US); David A. Shereyk, Homewood, IL (US)

(73) Assignee: Illinois Tool Works Inc, Glewniew, IL (US)

( * ) Notice: Subject to any disclaimer, the term of this patent is extended or adjusted under 35 U.S.C. 154(b) by 119 days.

(21) Appl. No.: 11/069,845

(22) Filed: Feb. 28, 2005

(65) Prior Publication Data
US 2006/0191111 A1 Aug. 31, 2006

(51) Int. Cl.
*B65D 63/00* (2006.01)
(52) U.S. Cl. .................... 24/16 PB; 248/74.3
(58) Field of Classification Search .............. 24/16 R, 24/16 PB, 17 A, 17 AP, 30.5 P, 20 TT; 248/74.3; 292/307 A, 318, 322, 325, 321, 319, 323, 292/307 R
See application file for complete search history.

(56) References Cited

U.S. PATENT DOCUMENTS

| | | | | |
|---|---|---|---|---|
| 3,913,187 A | * | 10/1975 | Okuda | 24/484 |
| 4,128,918 A | * | 12/1978 | Wenk | 24/16 R |
| 4,183,120 A | * | 1/1980 | Thorne | 24/16 R |
| 4,306,740 A | * | 12/1981 | Kleykamp et al. | 285/39 |
| 5,820,048 A | | 10/1998 | Shereyk et al. | 248/68.1 |
| 6,164,605 A | * | 12/2000 | Drake et al. | 248/74.3 |

\* cited by examiner

*Primary Examiner*—James R. Brittain
(74) *Attorney, Agent, or Firm*—Mark W. Croll; Paul F. Donovan

(57) ABSTRACT

A ratcheting clip includes a center section, a male end and a female end, the female end having a top half and a bottom half. The male end is configured to be inserted into the female end between the top and bottom half so that opposing sets of teeth hold the male end and female end together. To prevent inadvertent disengagement of the opposing sets of teeth, the male end includes a retaining surface that is configured to interface with a track disposed in the top half of the female end. Once the male end is inserted into the female end, the interface between the retaining surface and the track prevents lateral forces from causing one end to move in a lateral direction with respect to the other end. The interface between the retaining surface and the track further prevents the top half from being lifted upward away from the male end.

19 Claims, 6 Drawing Sheets

ANTI-REMOVAL RATCHET CLIP

FIELD OF THE INVENTION

The present invention relates generally to ratcheting clips or locks and more particularly to a feature on a ratcheting clip that inhibits removal of the ratcheting clip.

BACKGROUND OF THE INVENTION

It is known to use ratcheting clips to mount objects together, particularly cylindrical objects. Ratcheting clips have been used to aid in mounting and positioning of tubing and wire bundles but can also be used to mount a first object, such as a brake line, a piece of tubing or a wire bundle, to a second object, such as a second piece of tubing or a drive shaft. Typically, the ratcheting clip is configured to mount to a particular range of diameters and includes a first and a second end. The first and second ends are configured to mate so as to allow the ratcheting clip to mount to the surface of the object, such as an outer diameter of a section of tubing. Typically, the two ends are configured to overlap when the ratcheting clip is installed. The first end includes a first set of teeth on the outside surface that have a first angle. The second end includes a corresponding second set of teeth on the inner surface having a second angle that can be complimentary of the first angle of the first set of teeth. When the first and second ends are joined, the second end covers the first end and the corresponding angles of the two sets of teeth and the tension provided by joining the two ends causes the two sets of teeth to engage each other so that the ratcheting clip will stay mounted to the intended object.

These known ratcheting clips, however, have certain drawbacks. For example, known ratcheting clips can become disengaged when a lateral force is exerted on one of the ends, i.e., parallel to the tube on which it is mounted. The lateral force will cause one of the ends to slide relative to the other end so that the two sets of teeth cease to engage each other and the ratcheting clip becomes disengaged. Another problem is that an outwardly directed force exerted on the second end can cause the second end to lift away from the first end so that the teeth become disengaged and the ratcheting clip ceases to be fastened to the desired object. The present invention is directed at overcoming these and other known problems and drawbacks with existing ratcheting clips and specifically the problems associated with ratcheting clips becoming disengaged.

SUMMARY OF THE INVENTION

The present invention is directed to a ratcheting clip that includes a male end and a female end. When the male end is inserted into the female end, a retaining wall on the male end interfaces with a track on the female end. The interface of the track and the retaining wall prevents lateral forces from causing either the female or the male end to move relative to the other. The interface between the track and the retaining wall also prevents either of the ends from being lifted up. Thus, the interface between the track and the retaining wall helps prevent the ratcheting clip from becoming disengaged. Accordingly, once the ratcheting clip is installed on an object, there is a reduced risk that inadvertent contact with the ratcheting clip will cause it to become disengaged from the object. In an exemplary embodiment, the ratcheting clip can include one or more secondary clips configured to support or mount to other objects.

Other features and advantages of the invention will become apparent to those skilled in the art upon review of the following detailed description, claims and drawings in which like numerals are used to designate like features.

Figure 1:
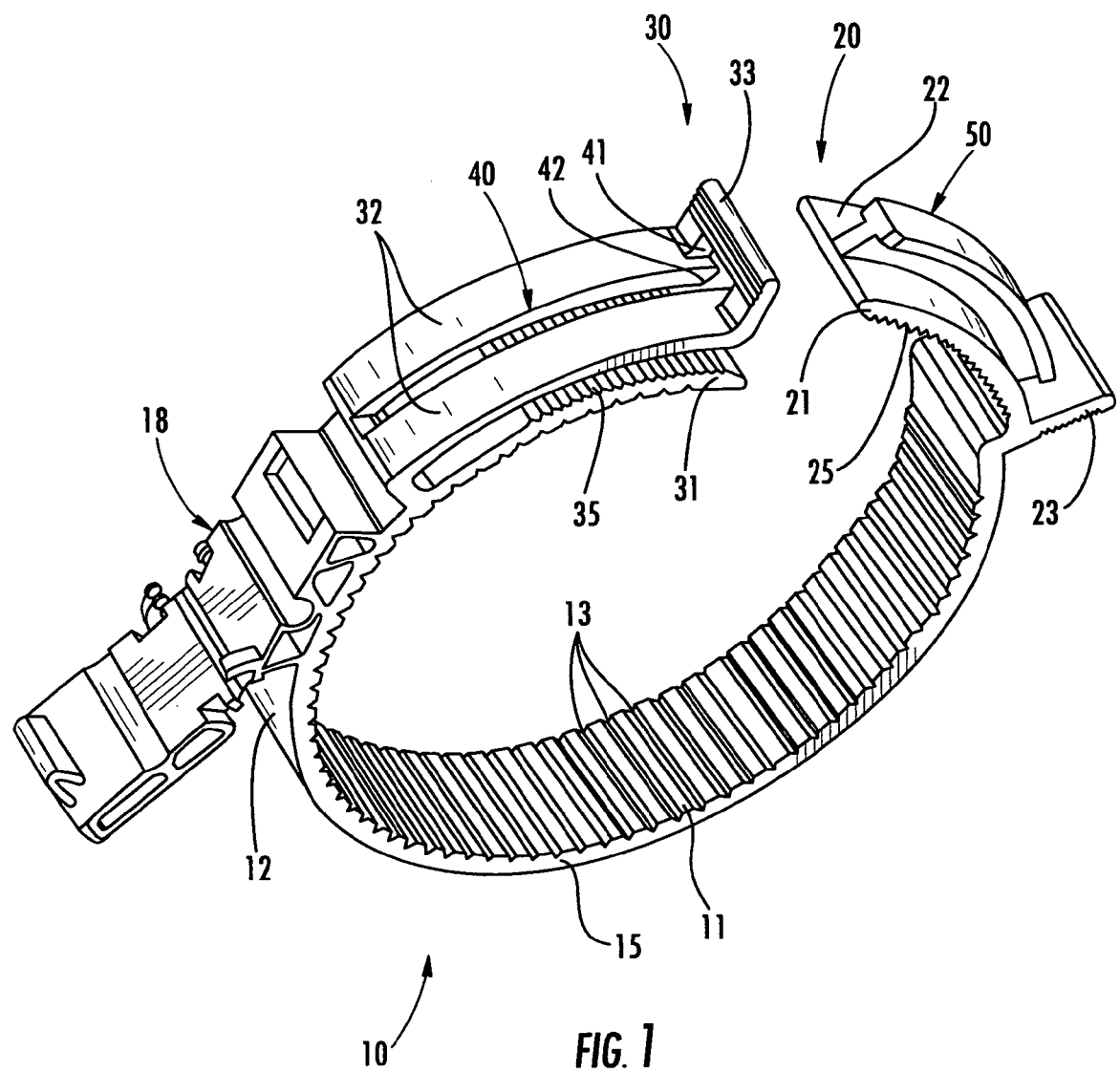
FIG. 1 is an isometric view of an exemplary ratcheting clip of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

Figure 2:
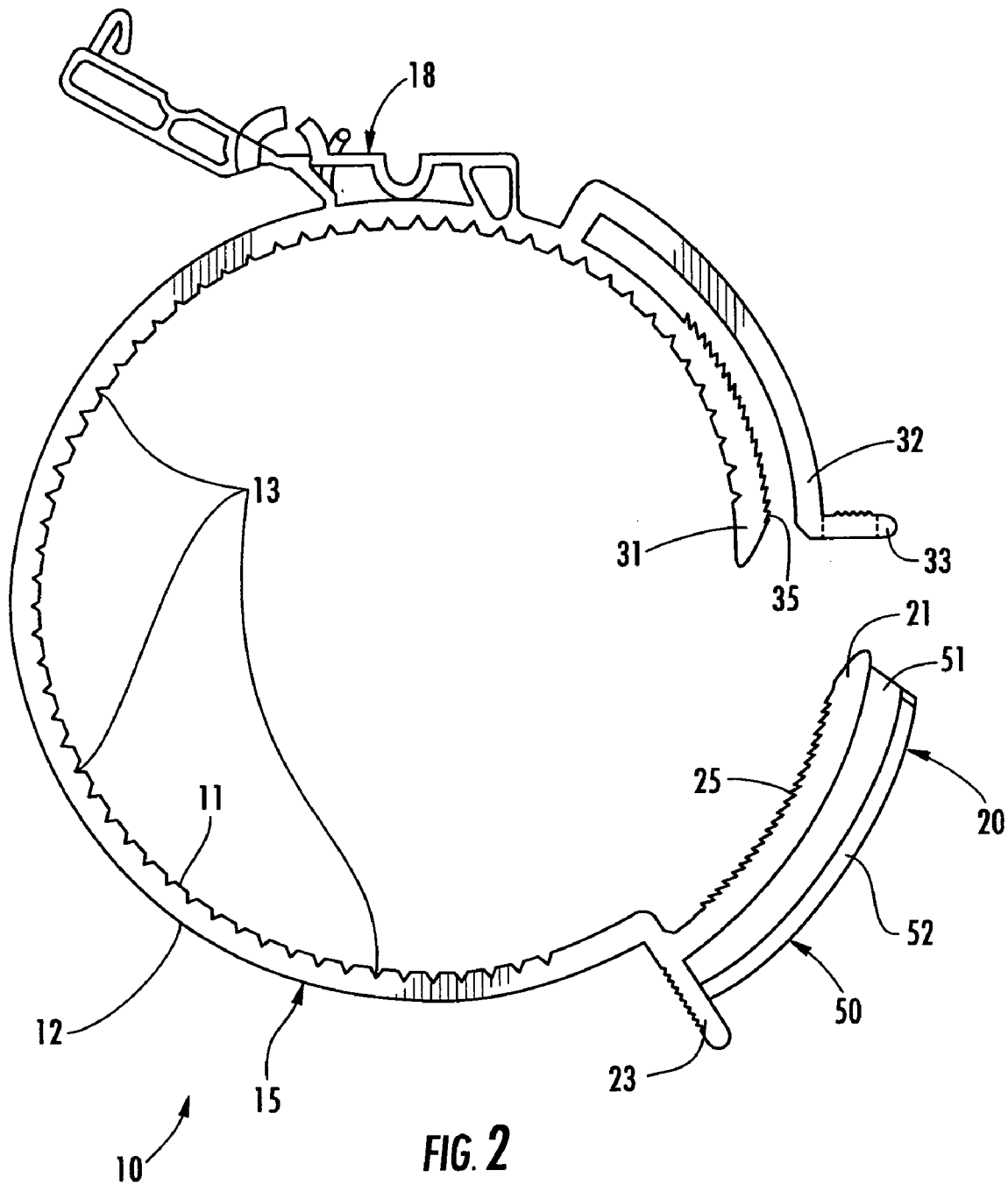
FIG. 2 is a side view of the embodiment depicted in FIG. 1.

Referring to FIGS. 1 and 2, an exemplary embodiment of a ratcheting clip 10 of the invention is depicted. The ratcheting clip 10 can be made of various types of material such as nylon 6/6, and if a plastic such as nylon 6/6 is used, it can include fillers such as glass fibers as desired. Thus, depending on the needed properties of the ratcheting clip 10, the materials used to make the ratcheting clip can be varied. As is known in the art, ratcheting clips such as the ratcheting clip 10 can be made using a known molding process.

As depicted, the ratcheting clip 10 includes a first clip 18 for use in supporting an object. The ratcheting clip 10 could be provided with other types of clips as desired. In an alternative embodiment, the ratcheting clip 10 could be provided without the first clip 18.

As illustrated in FIGS. 1 and 2, the ratcheting clip 10 includes an inner surface 11 and an outer surface 12. To allow the ratcheting clip 10 to close in a desired manner, a series of notches 13 can be included on the inner surface 11. The notches 13 provide a level of stress relief when the ratcheting clip 10 is in the closed position and also aid in reducing the force needed to close the ratcheting clip 10. It should be noted that in reference to the ratcheting clip 10, an inward direction is the radial direction toward the center of the ratcheting clip 10 when the ratcheting clip 10 is in the installed position, and an outward direction is the radial direction away from the center.

FIGS. 1 and 2 depict the ratcheting clip 10 in a relaxed, pre-installed condition with the ratcheting clip configured to mount to an object with a circular outer surface. The ratcheting clip 10 includes a center portion 15 that connects a male end 20 and a female end 30. The male end 20 includes a base 21 that includes a set of teeth 25, the set of teeth 25 directed in an inward direction. The base 21 is configured to be inserted into the female end 30, specifically between the bottom half 31 and the top half 32. An outwardly directed set of teeth 35 located on the bottom half 31 is configured to mate with the set of teeth 25. As is known in the art, the two sets of teeth 25, 35 can be configured to be at substantially complimentary angles when the ratcheting clip 10 is installed. The base 21 further includes an outer surface 22 from which a retaining wall 50 extends. The top half 32 includes a track 40, formed by a notch 41 and a notch 42. The retaining wall 50 is configured to mate with the track 40 in a manner to be described more fully below.

When the male end 20 and female end 30 are connected, the ratcheting clip 10 is configured to firmly mount to a range of diameters. As can be appreciated, the tab 23 and the tab 33 (FIG. 2) are provided so that the base 21 can be forcefully inserted in between the bottom half 31 and the top half 32. Typically, the distance the male end 20 can be inserted into the female end 30 will be limited by the outer diameter of the object on which the ratcheting clip 10 is being mounted. The inclusion of the tabs 23 and 33 allow the user of the ratcheting clip 10 to more readily apply a force to close the ratcheting clip 10. Beneficially, the tab 33 is located at the end of female end 30 so as to minimize the distance between tab 33 and tab 23 and facilitate the insertion of the male end 20 into the female end 30.

Figure 3:
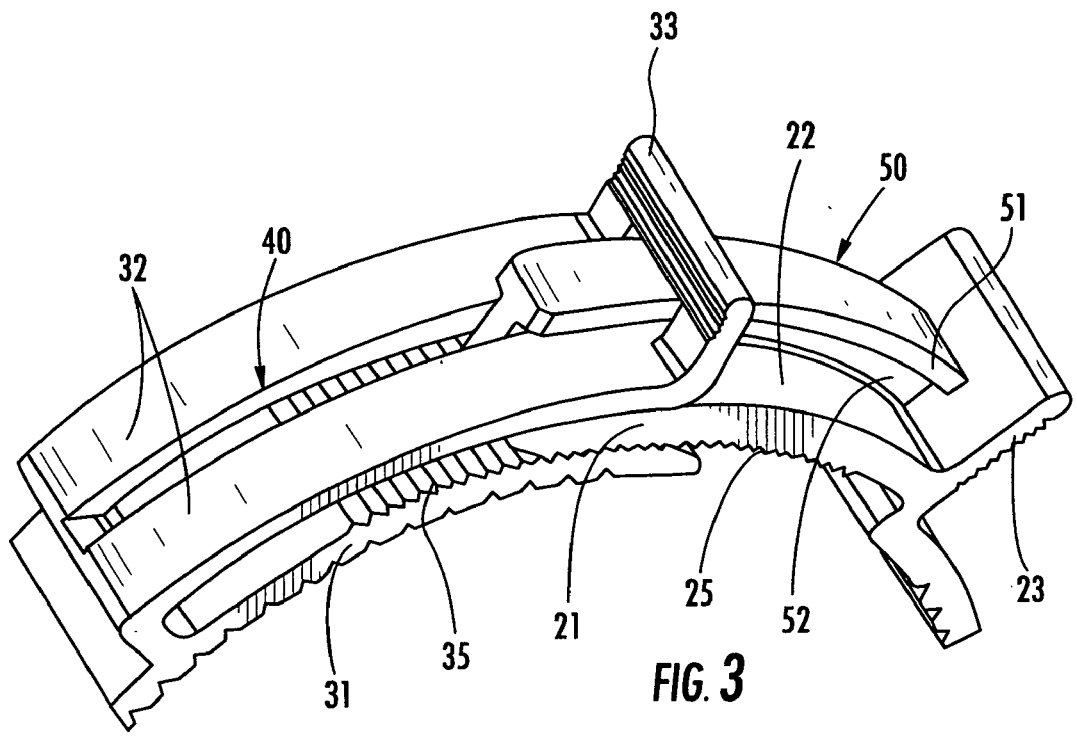
FIG. 3 is an isometric view of a portion of the ratcheting clip depicted in FIG. 1.

Turning to FIG. 3, a portion of the ratcheting clip 10 is illustrated. As depicted, the base 21 includes the set of teeth 25 and the outer surface 22. Extending outward from the outer surface 22 is the retaining wall 50. As depicted, the retaining wall 50 extends outwardly from the surface 22 and includes a flange 51 mounted on an arm 52. Referring back to FIG. 1, the retaining wall 50 and the base 21 together form a modified I-beam shape.

Figure 4:
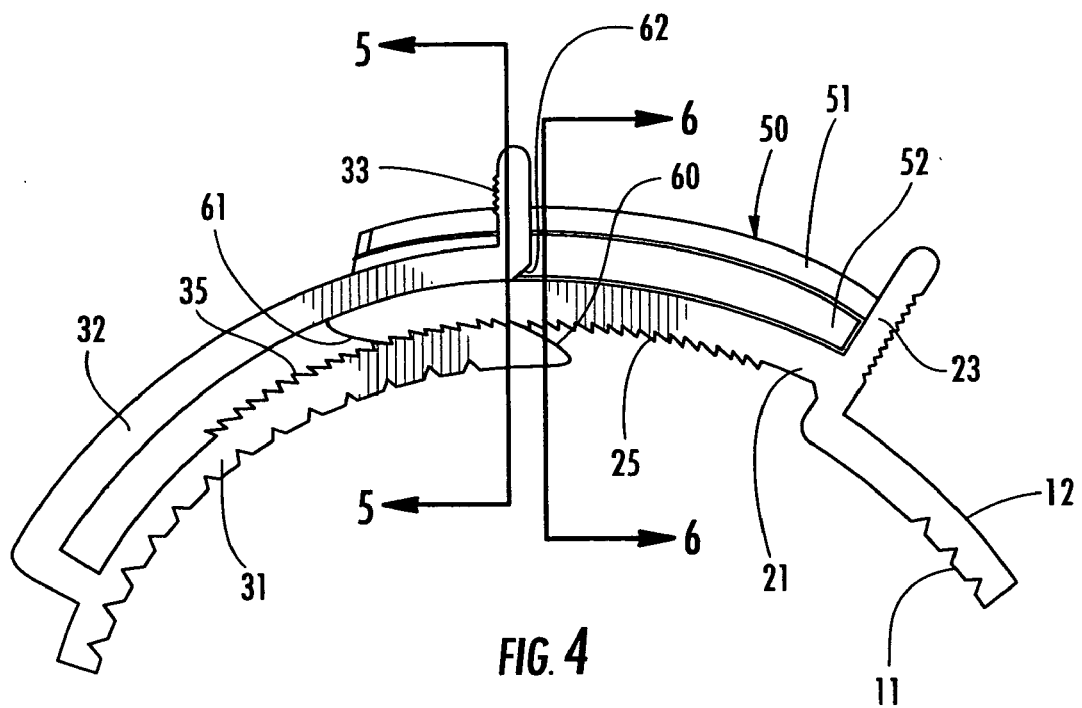
FIG. 4 is a side view of the portion of the ratcheting clip depicted in FIG. 3.

Turning to FIG. 4, a side view of a portion of the ratcheting clip 10 is illustrated. The end of the base 21 includes a chamfer 60. The bottom half 31 has a corresponding chamfer 61 and the top half 32 includes a chamfer 62. While not required, the chamfers 60, 61 and 62 aid in ensuring the base 21 will readily insert between the bottom half 31 and top half 32 in the desired manner. In addition, the base 21 is depicted as fitting between the bottom half 31 and the top half 32 in a line-to-line fit. As the top half 32 has some flexibility, the clearance between the top half 32 and bottom half 31 can be less than the thickness of the base 21 so that an interference fit is provided. Configuring the ratcheting clip 10 to provide an interference fit assists in helping to ensure the sets of teeth 25, 35 engage each other. In such an interference fit configuration, the chamfers 60, 61 and 62 are beneficial in allowing the male end 20 to be readily inserted into the female end 30.

Figure 5:
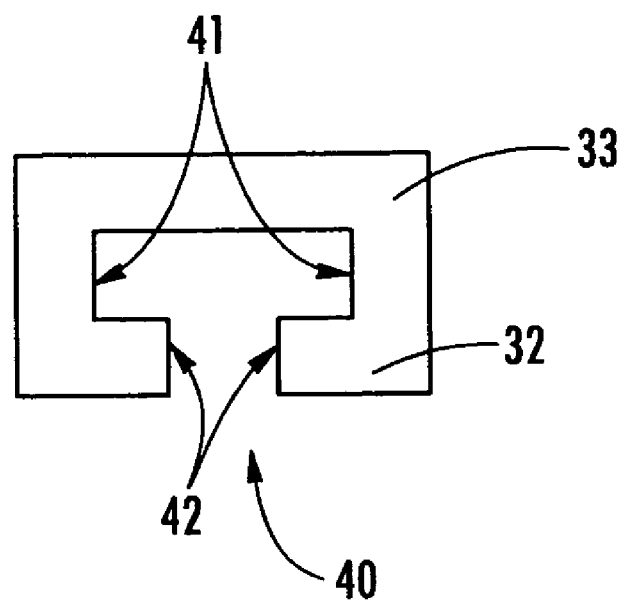
FIG. 5 is a cross-sectional view of the female end of the ratcheting clip depicted in FIG. 4, taken along the line 5—5.

Turning to FIG. 5, a cross section of the top half 32 taken along the line 5—5 in FIG. 4 is provided. The track 40 is defined by a notch or opening 41 and a notch or opening 42. The notch 41 is provided in the tab 33 and is configured to correspond with the flange 51 of the retaining wall 50. The notch 42 is also provided in the tab 33 and is further provided along a substantial portion of the length of the top half 32. The notch 42 is configured to correspond to the arm 52 of the retaining wall 50.

Figure 6:
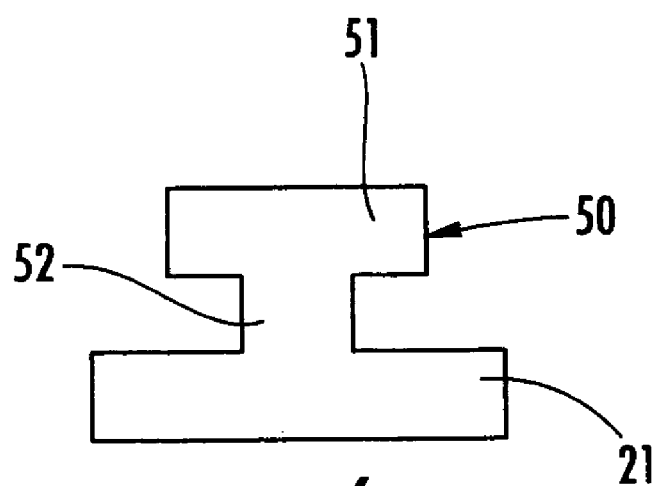
FIG. 6 is a cross-sectional view of the male end of the ratcheting clip depicted in FIG. 4, taken along the line 6—6.

Referring now to FIG. 6, a cross-section of the male end 20 along the line 6—6 in FIG. 4 is illustrated. The retaining wall 50 is mounted to the base 21 and includes the flange 51 supported by the arm 52. The retaining wall 50 is shaped to interface with the track 40. Referring to FIGS. 5 and 6, to aid in the installation of the ratcheting clip 10, the notch 41, the notch 42, the flange 51 and the arm 52 are configured so that there is some clearance between the corresponding portions. In other words, the notches 41 and 42 form a "T" shaped passageway configured to be slightly larger than the "T" shaped retaining wall 50.

Referring to FIGS. 3, 5 and 6, the retaining wall 50 is inserted into the track 40 when the male end 20 and the female end 30 are connected. Once the retaining wall 50 is inserted into the track 40, the notch 42, being narrower than the flange 51 of the retaining wall 50, prevents the top half 32 from being moved in an outward direction. Accordingly, attempts to lift up on the tab 33 do not readily cause the ratcheting clip 10 to become disengaged. Furthermore, the interface between the arm 52 and the notch 42 prevents the male end 20 from moving in a lateral direction relative to the female end 30 when a lateral force is applied. Thus, inadvertent contact with the ratcheting clip 10 will not cause the ends of the ratcheting clip 10 to become disengaged.

Figure 7:
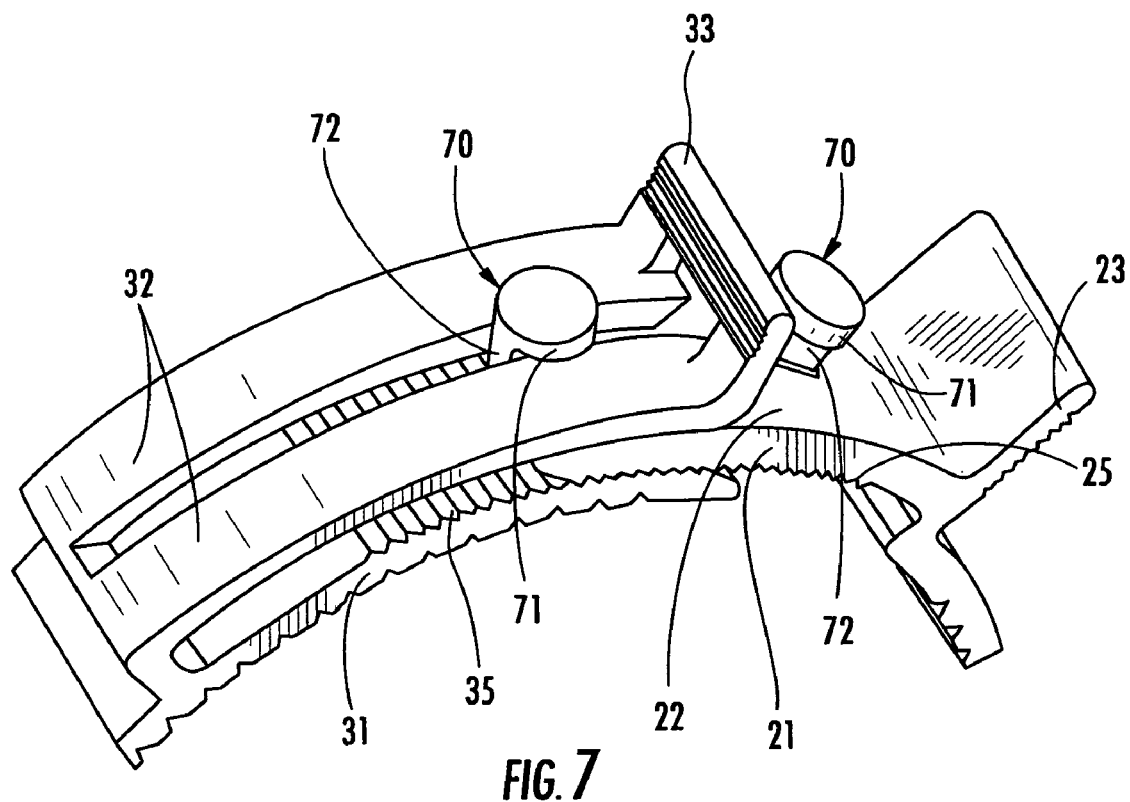
FIG. 7 is an isometric view of a portion of an alternative exemplary embodiment of a ratcheting clip in accordance with the present invention.
Figure 8:
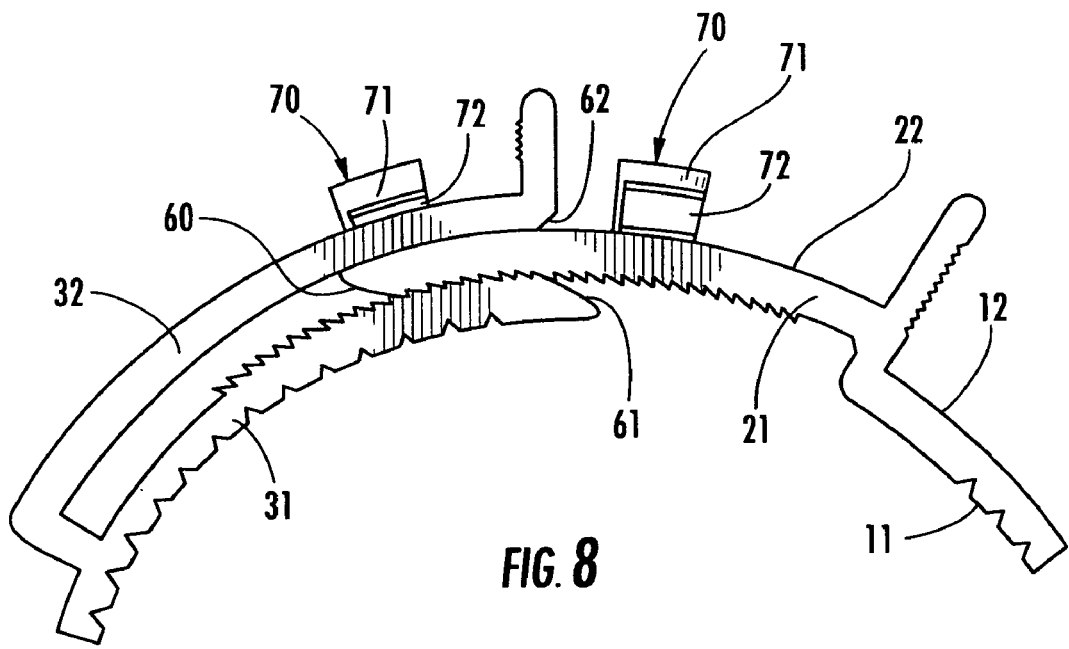
FIG. 8 is a side view of the portion of the ratcheting clip depicted in FIG. 7.

Turning now to FIGS. 7 and 8, an alternative exemplary embodiment of the present invention is illustrated. As depicted, the female end 30 is substantially the same as illustrated in the previous embodiment depicted in FIGS. 1 and 2. The male end 20, however, is configured somewhat differently. The base 21 supports two retaining buttons 70. The retaining buttons 70 includes a flange 71 mounted on an arm 72. The retaining button 70 interfaces with the track 40 in a manner as described above so as to prevent inadvertent contact with the ratcheting clip 10 causing the ratcheting clip to become disengaged. As depicted, two buttons 70 are provided, however more or less than two buttons would be suitable with the present invention. If only one button 70 is provided it may be preferable to locate the button in a central position so as to maximize its effectiveness in preventing the top half 32 from being lifted. Thus, it may be preferable to place the retaining button 70 in a position approximately halfway between the two buttons 70 illustrated in FIG. 7.

Figure 9:
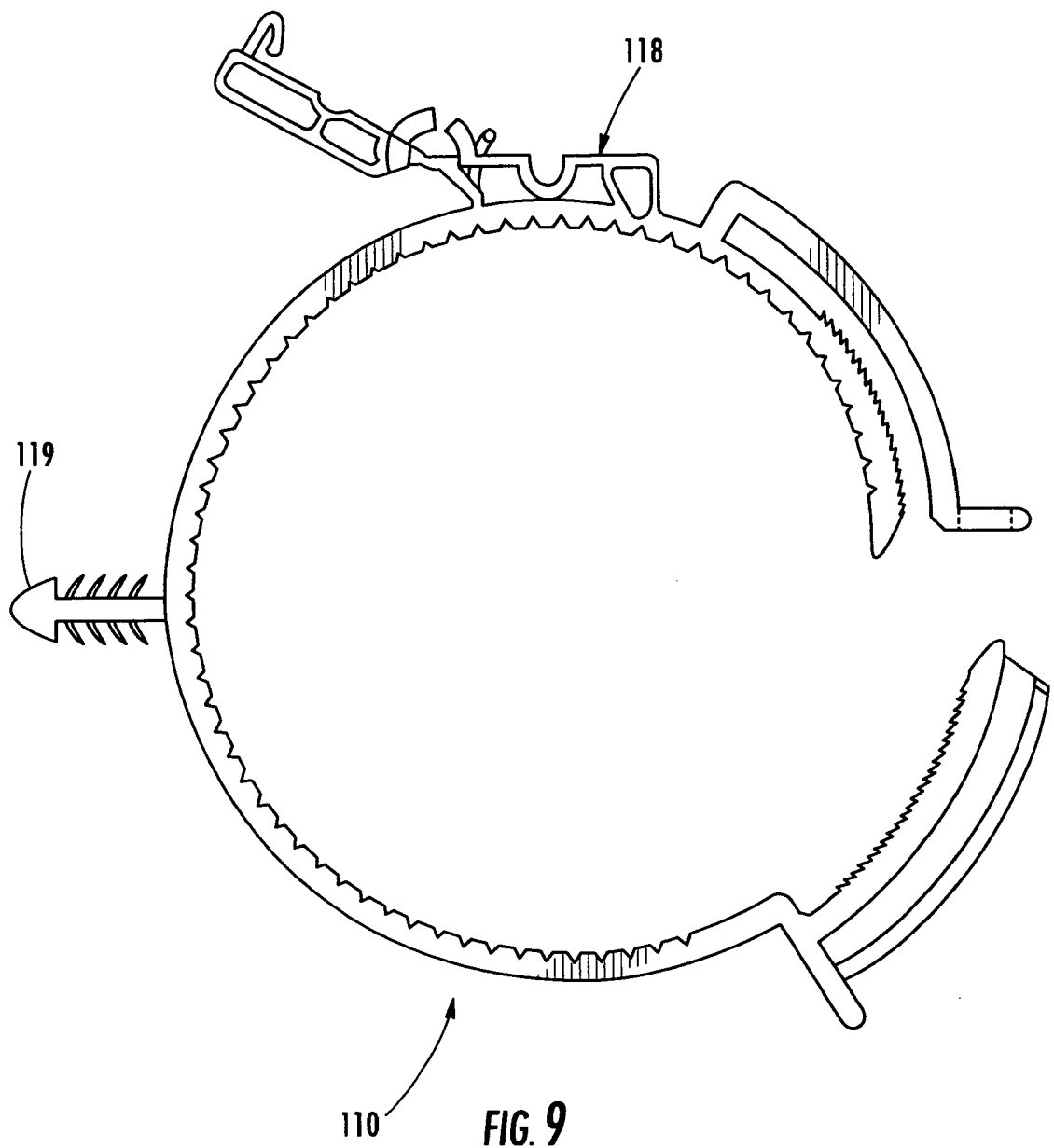
FIG. 9 is a side view of another alternative exemplary embodiment of a ratcheting clip in accordance with the present invention.

FIG. 9 illustrates an alternative exemplary embodiment of the present invention. The ratcheting clip 110 includes all the features described above and illustrated in the Figures, in addition to a secondary clip, such as a hinged, routing clip 118 configured to support a cylindrical object, and a mounting post 119 configured to mount the ratcheting clip 110 to a supporting surface. The routing clip 118 and mounting post 119 are similar to the clips and posts disclosed in U.S. Pat. No. 5,820,048 issued to Shereyk et al. and assigned to Illinois Tool Works, Inc., which is incorporated herein by reference. In alternative embodiments, only one of the clip 118 or post 119 could be included or additional clips or posts could be included as desired. Accordingly, a ratcheting clip could include a first clip or post having a desired functionality and could also include additional clips or posts having the same or different functionality.

In the illustrated embodiments, the retaining wall and retaining button are depicted as "T" shaped. The present invention, however, is not limited to the illustrated "T" shape. The retaining surface could be some other shape such as an inverted triangular shape, an inverted tear drop shape or some other shape that includes an upper portion somewhat larger than the lower portion. In addition, the retaining surface need not be symmetrical. Thus, the retaining surface could be shaped like an upside down "L." In order to provide a preferable interface between the track 40 and the retaining surface, however, both should be configured accordingly. A benefit of using the retaining wall 50 as depicted in the Figures is that a force applied to lift the top half 32 would be more symmetrically distributed. Furthermore, the fact that the retaining wall 50 can be configured to run substantially the entire length of the base 21 allows the retaining wall 50 to be configured to maximize resistance to a lifting force on the top half 32 regardless of how far the male end 20 is inserted into the female end 30.

In an alternative embodiment, the track could be shaped so as to fit around the retaining surface, somewhat like a groove configured to accept a flange. Such an interface would prevent the two ends from becoming inadvertently disengaged.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A ratcheting clip comprising:
   a center portion;
   a male end attached to the center portion, the male end comprising:
      a base, the base including a first set of teeth and an outer surface;
      a retaining surface mounted on the outer surface, the retaining surface including an arm and a flange;
   a female end attached to the center portion; the female end comprising:
      a top half;
      a bottom half, the bottom half including a second set of teeth configured to mate with the first set of teeth; and
      a track provided in the top half, the track configured to accept the retaining surface, wherein the track includes a first notch and a second notch, and wherein the first notch is configured to interface with the arm of the retaining surface and the second notch is configured to interface with the flange of the retaining surface.

2. The ratcheting clip of claim 1, wherein the retaining surface is "T" shaped.

3. The ratcheting clip of claim 2, wherein the retaining surface is a retaining wall.

4. The ratcheting clip of claim 2, wherein the retaining surface is at least one retaining button.

5. The ratcheting clip of claim 1, further comprising a first tab on the male end and a second tab on the female end, whereby the tabs assist in the insertion of the male end into the female end.

6. The ratcheting clip of claim 1, wherein the first and second notch form a "T" shaped passageway.

7. The ratcheting clip of claim 6, wherein the arm and the flange have a "T" shape.

8. A ratcheting clip comprising:
   a center portion having an inner surface and an outer surface, the inner surface including a series of notches;
   a male end supported by the center portion, the male end including a base having a thickness and a first set of teeth;
   a female end supported by the center portion, the female end including a top half and a bottom half, the bottom half including a second set of teeth;
   a retaining surface supported by the base, the retaining surface including an arm and a flange; and
   a track provided in the top half, the track configured to interface with the retaining surface, wherein the track includes a first notch and a second notch and wherein the first notch is configured to interface with the arm of the retaining surface and the second notch is configured to interface with the flange of the retaining surface.

9. The ratcheting clip of claim 8, further comprising a secondary clip mounted on the outer surface.

10. The ratcheting clip of claim 9, wherein the base further comprises a first chamfer and the bottom half further comprises a second chamfer, whereby the first and second chamfer and in the insertion of the male end into the female end.

11. The ratcheting clip of claim 10, wherein the space between the top half and the bottom half is less that the thickness of the base when the clip is in a relaxed position.

12. The ratcheting clip of claim 9, wherein the retaining surface is "T" shaped.

13. The ratcheting clip of claim 9, wherein the retaining surface is symmetrical.

14. The ratcheting clip of claim 12, wherein the retaining surface is a retaining wall.

15. The ratcheting clip of claim 12, wherein the retaining surface is at least one retaining button.

16. The ratcheting clip of claim 9, further comprising a mounting post mounted on the outer surface, wherein the secondary clip is configured to support a second object and the mounting post is configured to secure the ratcheting clip to a supporting surface.

17. A method of installing a clip comprising the steps of:
   providing a ratcheting clip with a male end, the male end including a first tab and a base with a first set of teeth and a retaining surface including an arm and a flange, and a female end, the female end including a second tab and a top half having a track including a first notch and a second notch configured to interface with the retaining surface and a bottom half having a second set of teeth;
   positioning the ratcheting clip on a first object; and
   inserting the male end into the female end so that the retaining surface interfaces with the track such that the first notch interfaces with the arm and the second notch interfaces with the flange, and the first set of teeth engages the second set of teeth.

18. The method of claim 17, further comprising the steps of applying a first force on the first tab and applying a second force on the second tab so as to cause the male end to be more fully inserted into the female end.

19. The method of claim 18, further comprising the steps of fastening a second object to a secondary clip mounted on the ratcheting clip, whereby the second object is supported in relation to the first object.

* * * * *